United States Patent Office.

JOSEF KLIEBER, OF NEUSATTL, ASSIGNOR TO CARL GÖTZ, OF CARLSBAD, AUSTRIA-HUNGARY.

LIQUID MATERIAL FOR THE MANUFACTURE OF FINE EARTHENWARE.

SPECIFICATION forming part of Letters Patent No. 500,585, dated July 4, 1893.

Application filed January 8, 1892. Serial No. 417,348. (No specimens.)

*To all whom it may concern:*

Be it known that I, JOSEF KLIEBER, a subject of the Emperor of Austria-Hungary, residing at Neusattl, in the Kingdom of Bohemia, Austria-Hungary, have invented certain new and useful Improvements in the Liquid Material or Slip Used in the Manufacture of Porcelain, Fine Earthenware, and the Like, of which the following is a specification.

While by the ordinary process the liquid or "slip" to be poured into molds for making articles of porcelain, stoneware and the like, is so prepared that the mass has to be mixed with about one and one half parts of water in order to make it sufficiently fluid for pouring, the process which forms the subject of the present invention, consists in mixing the mass, sufficiently moist, with an aqueous solution of carbonate of soda, bicarbonate of soda or calcined soda and thus the mass is made sufficiently fluid and fit for pouring. The use of the calcined soda insures a porcelain of pure white color. It is quite sufficient to add to one thousand parts by weight of the porcelain mass about one part by weight of the concentrated solution, selecting the proportion most suitable to the mass; for fine earthen ware a little additional water being necessary.

In order to prevent the swellings and gray color which are sometimes produced upon articles of porcelain, especially at their edges, during the process of burning, it is advisable to add to the aqueous solution sufficient cinnabar to give to the entire solution a delicate but very weak rose tint. By adding cinnabar the emollescence of the mass is accelerated and the ability of pouring is insured.

The mixture or slip prepared in the manner described, although the large quantity of water present in the mixture as ordinarily used is absent, is nevertheless more fluid than the latter, contains no air bubbles, flows into the extreme parts and into all the narrowest and smallest details of the mold and allows the manufacture, in this way, of articles which hitherto could not be formed by pouring the material into molds, but had to be turned or shaped separately, as for instance reliefs or large oval dishes or vessels.

In many articles a separate mold was necessary for each part, as for instance, in a coffee pot, three molds would be necessary, viz: one for the body, one for the handle and one for the spout. By the present improvements the possibility of manufacturing porcelain and earthen ware goods by pouring is so extended that a quicker and at the same time better product is possible.

An ordinary workman can produce with this invention at least six hundred large dishes or vessels in a week, while a clever and experienced turner can at the outside make but one hundred to one hundred and sixty during the same time.

The articles produced by the improved method are of much more uniform quality and density, more solid, stronger, and less liable to break, than those made from ordinary material or "slip" or than those turned or finished separately.

While by the ordinary process the mold can at most be used three times in succession and then requires to be dried, the mold can by the use of the soda solution be used ten to twelve times and can then be dried much more quickly. For this reason the troublesome drying plant for the molds is greatly reduced and injury to the molds themselves is also largely prevented. Consequently for a new factory a smaller stock of molds than usual is necessary in the first place and the consumption of this stock is also considerably reduced as compared with the present system. Moreover the contraction which takes place during the burning of the articles and which with the ordinary mixture or "slip" prepared with water is in about the proportion of from five to four, or from six to five, is greatly reduced by the new process where it is in about the proportion of eight to seven.

Articles prepared by the improved process do not require as high a heat in the oven as hitherto or from 1,750° to 1,800°, but only about 1,600°. Moreover the mass need not be ground for more than sixteen hours and may be at once prepared with the carbonate of soda or soda solution, while by the old process twenty-two to twenty-four hours grinding is necessary and a subsequent much longer storing of the mass.

By the use of the new process, ornamentations by burned in colors can be readily applied.

What I claim is—

A composition to be used in a liquefied slip for earthenware consisting of clay and a dissolvent composed of an aqueous solution of carbonate or bicarbonate of soda, substantially as specified.

Signed at Prague, Bohemia, this 22d day of December, 1891.

JOSEF KLIEBER.

Witnesses:
ALFRED GOLDSCHMID,
LEO ADLER.